US011036077B2

United States Patent
Oh et al.

(10) Patent No.: US 11,036,077 B2
(45) Date of Patent: Jun. 15, 2021

(54) OPTICAL FILM FOR IMPROVING CONTRAST RATIO, POLARIZING PLATE COMPRISING SAME, AND LIQUID CRYSTAL DISPLAY COMPRISING SAME

(71) Applicant: Samsung SDI Co., Ltd., Yongin-si (KR)

(72) Inventors: Young Oh, Suwon-si (KR); Dong Ho Wee, Suwon-si (KR); Young Hyun Ju, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 16/348,844

(22) PCT Filed: Nov. 3, 2017

(86) PCT No.: PCT/KR2017/012433
§ 371 (c)(1),
(2) Date: May 9, 2019

(87) PCT Pub. No.: WO2018/093081
PCT Pub. Date: May 24, 2018

(65) Prior Publication Data
US 2019/0285938 A1    Sep. 19, 2019

(30) Foreign Application Priority Data

Nov. 16, 2016    (KR) .................. 10-2016-0152894

(51) Int. Cl.
| G02F 1/1335 | (2006.01) |
| G02B 5/02 | (2006.01) |
| G02B 5/30 | (2006.01) |

(52) U.S. Cl.
CPC ......... *G02F 1/133528* (2013.01); *G02B 5/02* (2013.01); *G02B 5/021* (2013.01);
(Continued)

(58) Field of Classification Search
CPC ......... G02F 1/133528; G02F 1/133504; G02F 1/1335; G02B 5/021; G02B 5/3041; G02B 5/0278; G02B 5/02
(Continued)

(56) References Cited

U.S. PATENT DOCUMENTS

2008/0310809 A1*  12/2008  Chen ............... G02B 5/045
                                                          385/130
2010/0238548 A1*   9/2010  Watanabe ......... G02F 1/133502
                                                          359/488.01
(Continued)

FOREIGN PATENT DOCUMENTS

| JP | 2003-177207 A | 6/2003 |
| JP | 2006-251659 A | 9/2006 |

(Continued)

*Primary Examiner* — Charles S Chang
(74) *Attorney, Agent, or Firm* — Lewis Roca Rothgerber Christie LLP

(57) ABSTRACT

Provided are an optical film for improving a contrast ratio, a polarizing plate comprising same, and a liquid crystal display comprising same, the optical film comprising a base layer and a contrast ratio-improving layer formed on the base layer, wherein the contrast ratio-improving layer comprises a first resin layer and a second resin layer directly formed on the first resin layer, wherein the refractive index of the first resin layer is different from that of the second resin layer, wherein the first resin layer comprises: a plurality of embossed first optical patterns formed to be separated in a first direction; a plurality of embossed second optical patterns formed to intersect with the first optical patterns and be separated in a second direction; and dented parts formed by the intersection of the first optical patterns and the second optical patterns, wherein the dented parts have a height lower than that of the first resin layer.

25 Claims, 6 Drawing Sheets

(52) U.S. Cl.
CPC ......... *G02B 5/0278* (2013.01); *G02B 5/3041* (2013.01); *G02F 1/1335* (2013.01); *G02F 1/133504* (2013.01)

(58) Field of Classification Search
USPC ..................................... 349/96–98, 117–121
See application file for complete search history.

(56) References Cited

U.S. PATENT DOCUMENTS

| | | | |
|---|---|---|---|
| 2016/0187699 A1* | 6/2016 | Ju ..................... | G02F 1/133528 349/65 |
| 2017/0052287 A1* | 2/2017 | Lee ......................... | G02B 6/00 |
| 2019/0243042 A1* | 8/2019 | Wee ........................ | G02B 1/11 |

FOREIGN PATENT DOCUMENTS

| | | |
|---|---|---|
| KR | 10-1597907 B1 | 2/2016 |
| KR | 10-2016-0023602 A | 3/2016 |
| KR | 10-1616918 B1 | 4/2016 |
| KR | 10-2016-0111580 A | 9/2016 |
| KR | 10-1656154 B1 | 9/2016 |
| KR | 10-1659241 B1 | 9/2016 |

\* cited by examiner

【Figure 1】
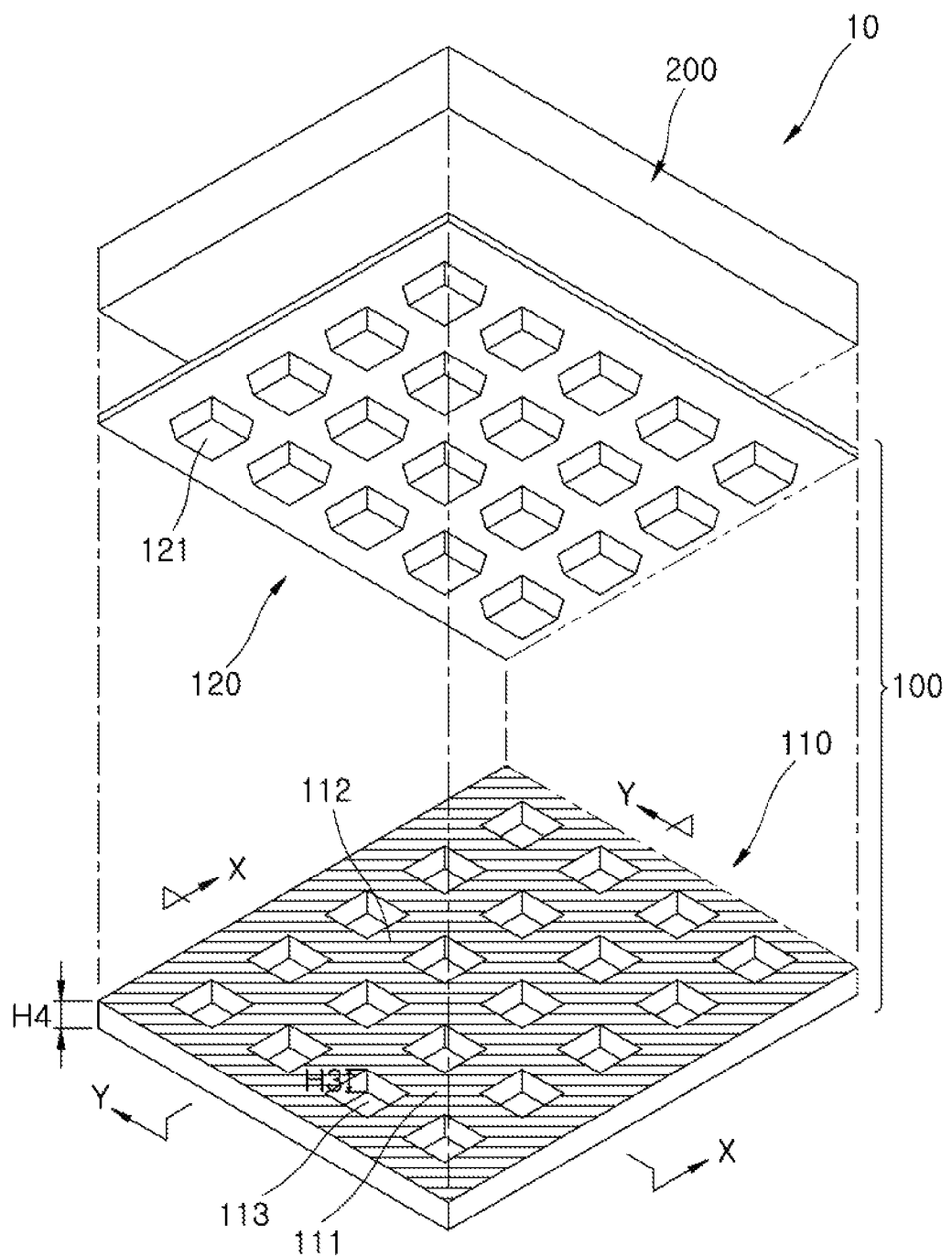

【Figure 2】
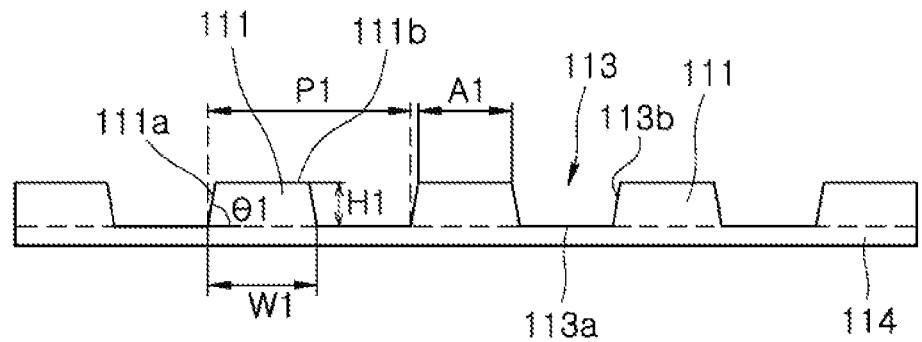
【Figure 3】
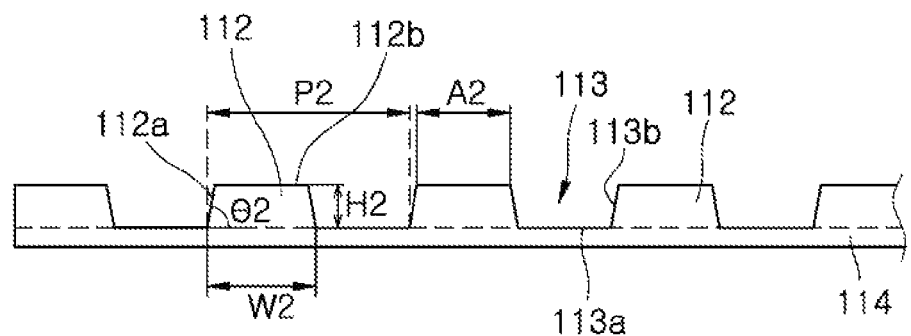
【Figure 4】
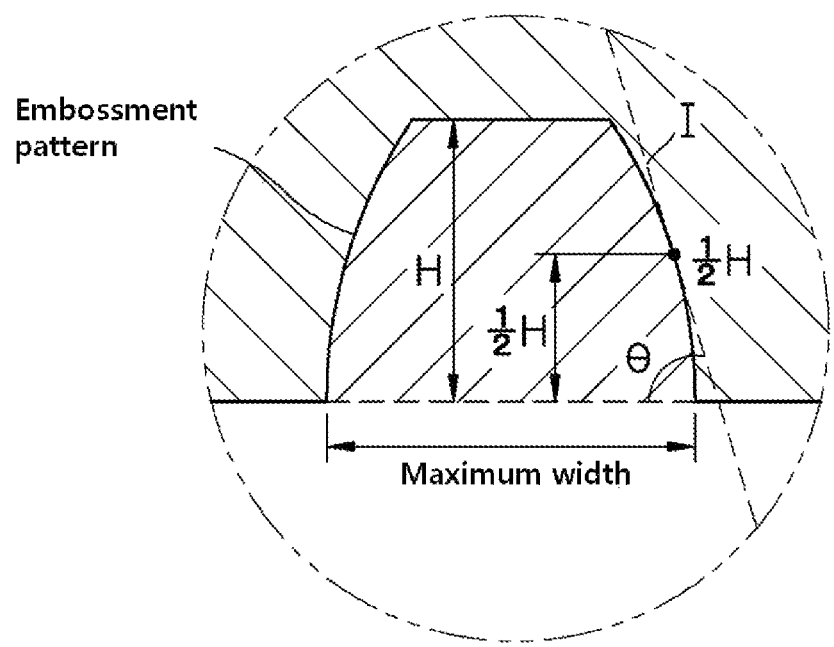

【Figure 5】
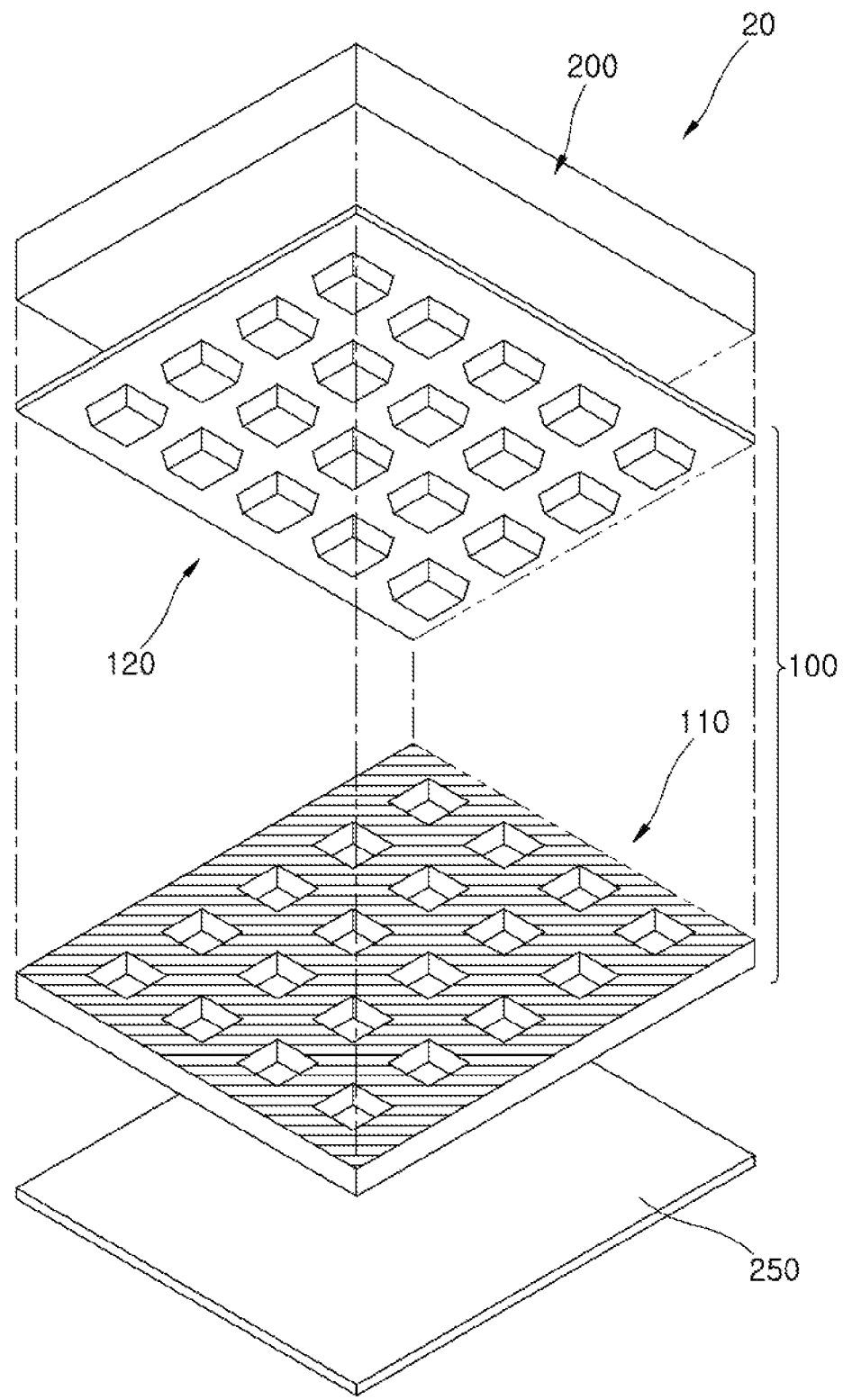

【Figure 6】
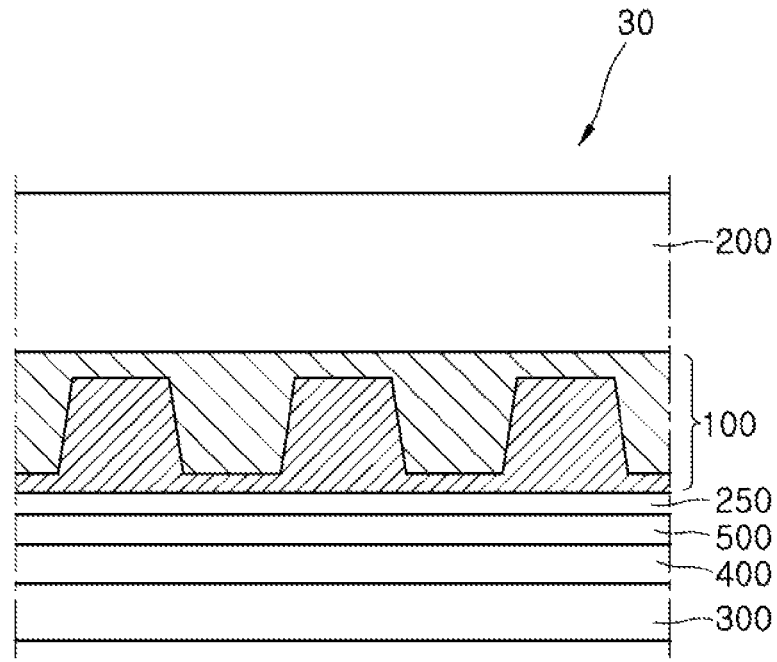
【Figure 7】
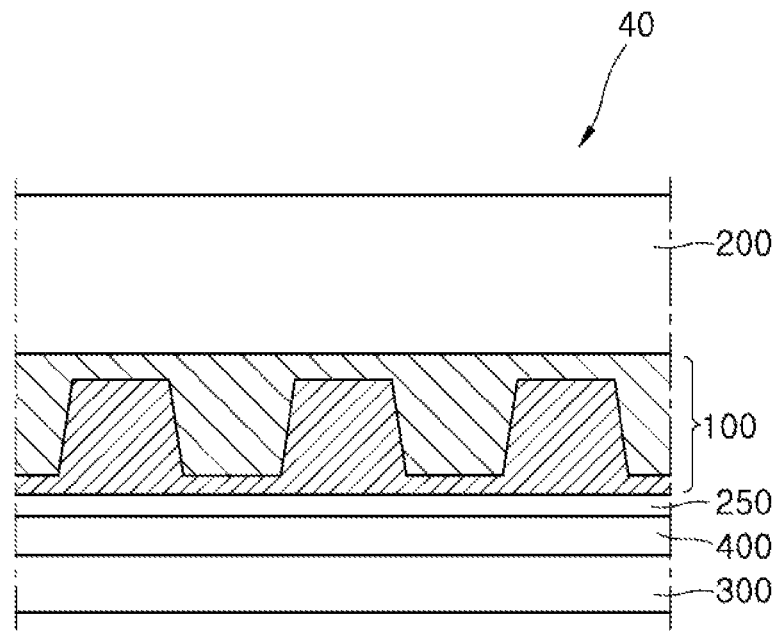

【Figure 8】
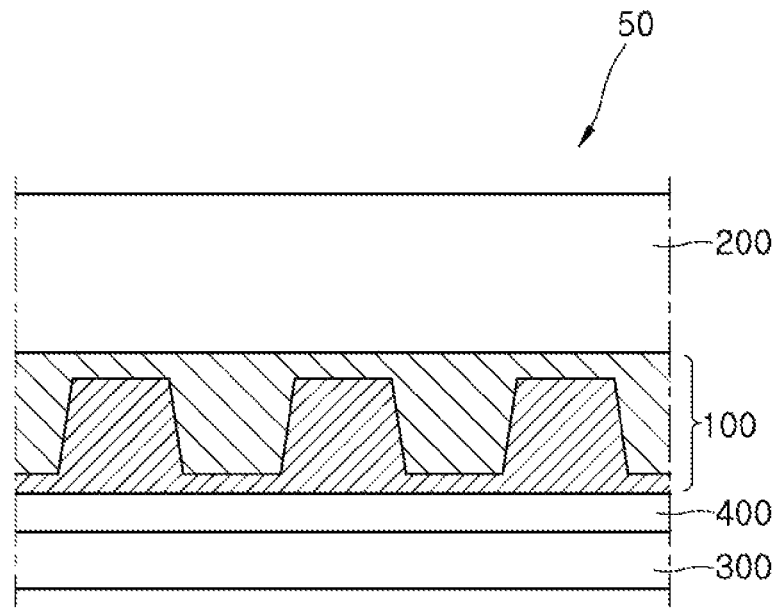
【Figure 9】
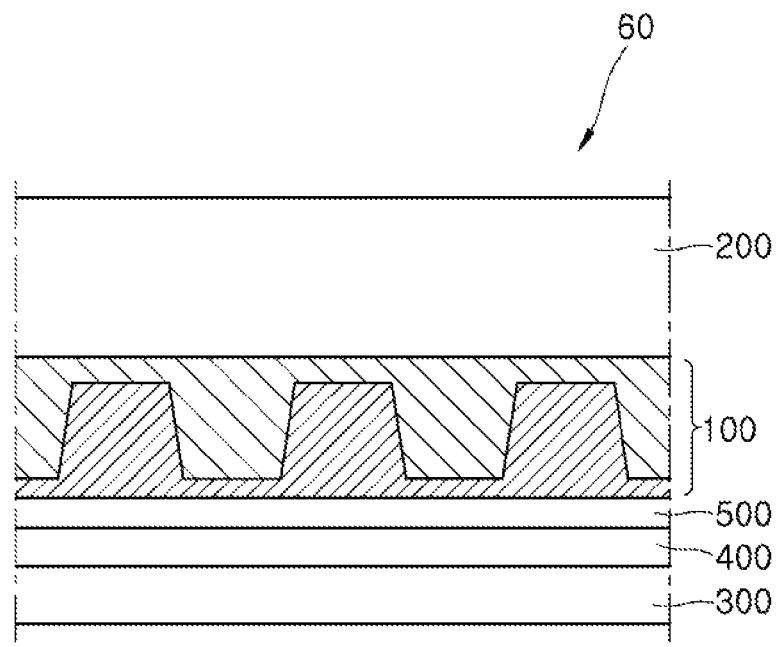

[Figure 10]
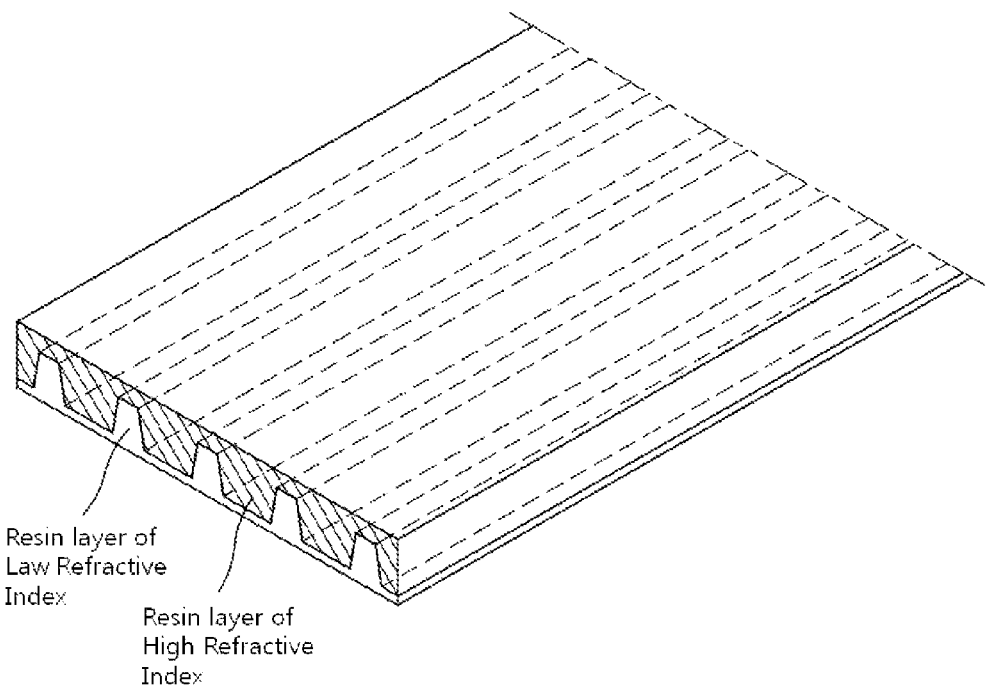

OPTICAL FILM FOR IMPROVING CONTRAST RATIO, POLARIZING PLATE COMPRISING SAME, AND LIQUID CRYSTAL DISPLAY COMPRISING SAME

CROSS-REFERENCE TO RELATED APPLICATIONS

This application is a National Phase Patent Application and claims priority to and the benefit of International Application Number PCT/KR2017/012433, filed on Nov. 3, 2017, which claims priority to and the benefit of Korean Patent Application No. 10-2016-0152894, filed on Nov. 16, 2016, the entire contents of each of which are incorporated herein by reference.

FIELD

The present invention relates to an optical film for improving contrast ratio, a polarizing plate including the same, and a liquid crystal display including the same.

BACKGROUND

A liquid crystal display is operated to emit light through a liquid crystal panel after receiving the light from a backlight unit. Thus, the liquid crystal display provides a good front contrast ratio. However, the liquid crystal display has a lower contrast ratio at lateral sides thereof. Various attempts have been made in order to increase side contrast ratio through modification of a liquid crystal panel or a liquid crystal structure. Higher side contrast ratio causes deterioration in front contrast ratio. Accordingly, there is a need for minimization of decrease of the front contrast ratio while increasing the side contrast ratio in order to improve visibility.

On the other hand, the liquid crystal display is configured to allow a display screen to be viewed not only at right and left sides thereof but also at upper and lower sides thereof. A conventional liquid crystal display focusing on improvement in visibility at the right and left sides thereof has been developed. Therefore, there is a need for an optical film for improving contrast ratio not only at the right and left sides thereof but also at the upper and lower sides thereof.

The background technique of the present invention is disclosed in Japanese Unexamined Patent Publication No. 2006-251659.

SUMMARY

It is an object of the present invention to provide an optical film for improving contrast ratio, which can improve contrast ratios (CRs) in all directions including upward, downward, rightward, leftward and diagonal directions of a display screen while improving a front contrast ratio.

It is another object of the present invention to provide an optical film for improving contrast ratio, which can improve quality of a display screen by suppressing bubble generation or facilitating removal of bubbles generated in manufacture thereof and can be easily formed of a composition having high viscosity.

It is a further object of the present invention to provide an optical film for improving contrast ratio, which is formed to have the same pattern in all directions and does not require cutting in a particular direction so as to comply with display characteristics, thereby allowing easy management of production yield and inventory.

In accordance with one aspect of the present invention, an optical film for improving contrast ratio includes: a base layer; and a contrast ratio improvement layer formed on the base layer, wherein the contrast ratio improvement layer includes a first resin layer and a second resin layer directly formed on the first resin layer, the first resin layer and the second resin layer having different refractive index, the first resin layer including a plurality of first optical patterns embossed and separated from each other in a first direction, a plurality of second optical patterns embossed to intersect the first optical patterns and separated from each other in a second direction, and a intaglio portion formed by intersection between the first optical patterns and the second optical patterns, the intaglio portion having a height less than or equal to the height of the first resin layer.

In accordance with another aspect of the present invention, a polarizing plate may include the optical film for improving contrast ratio according to the present invention.

In accordance with a further aspect of the present invention, a liquid crystal display may include the optical film for improving contrast ratio according to the present invention.

The present invention provides an optical film for improving contrast ratio, which can improve contrast ratios (CRs) in all directions including upward, downward, rightward, leftward and diagonal directions of a display screen while improving a front contrast ratio.

The present invention provides an optical film for improving contrast ratio, which can improve quality of a display screen by suppressing bubble generation or facilitating removal of bubbles generated in manufacture thereof and can be easily formed of a composition having high viscosity.

The present invention provides an optical film for improving contrast ratio, which is formed to have the same pattern in all directions and does not require cutting in a particular direction so as to comply with display characteristics, thereby allowing easy management of production yield and inventory.

BRIEF DESCRIPTION OF THE DRAWINGS

FIG. 1 is an exploded perspective view of an optical film for improving contrast ratio according to one embodiment of the present invention.

FIG. 2 is a cross-sectional view of a first resin layer of FIG. 1, which is taken in a first direction.

FIG. 3 is a cross-sectional view of the first resin layer of FIG. 1, which is taken in a second direction.

FIG. 4 is a sectional view showing a base angle of the first optical pattern having inclined planes each having a curved surface.

FIG. 5 is an exploded perspective view of an optical film for improving contrast ratio according to another embodiment of the present invention.

FIG. 6 is a cross-sectional view of a polarizing plate according to one embodiment of the present invention, which is taken in the first direction.

FIG. 7 is a cross-sectional view of a polarizing plate according to another embodiment of the present invention, which is taken in the first direction.

FIG. 8 is a cross-sectional view of a polarizing plate according to a further embodiment of the present invention, which is taken in the first direction.

FIG. 9 is a cross-sectional view of a polarizing plate according to yet another embodiment of the present invention, which is taken in the first direction.

FIG. 10 is a perspective view of a stack of second resin layers and first resin layers of a contrast ratio improvement layer formed in Comparative Example 2.

DETAILED DESCRIPTION

Embodiments of the present invention will be described in detail with reference to the accompanying drawings to provide thorough understanding of the invention to those skilled in the art. It should be understood that the present invention may be embodied in different ways and is not limited to the following embodiments. In the drawings, portions irrelevant to the description will be omitted for clarity. Like components will be denoted by like reference numerals throughout the specification.

Herein, spatially relative terms such as "upper" and "lower" are defined with reference to the accompanying drawings. Thus, it will be understood that the term "upper surface" can be used interchangeably with the term "lower surface", and when an element such as a layer or a film is referred to as being placed "on" another element, it can be directly placed on the other element, or intervening element(s) may be present. On the other hand, when an element is referred to as being placed "directly on" another element, there are no intervening element(s) therebetween.

Herein, the terms "horizontal direction" and "vertical direction" mean a longitudinal direction and a transverse direction of a rectangular screen of a liquid crystal display, respectively. As used herein, the term "side surface" means a region in which θ ranges from 45° to 60° in a spherical coordinate system (Φ, θ) in which a front side is indicated by (0°, 0°), a left end point is indicated by (180°, 90°), and a right end point is indicated by (0°, 90°) with reference to the horizontal direction.

Herein, the term "top part" means the highest portion of an optical pattern.

Herein, "aspect ratio" refers to a ratio of maximum height of an optical pattern to maximum width thereof (maximum height/maximum width).

Herein, "cycle" refers to the sum of the maximum width of one optical pattern and the width of one intaglio portion (width of a bottom surface of the intaglio portion) immediately adjacent to the optical pattern.

Herein, the term "embossed" used with respect to first and second optical patterns means that the corresponding pattern protrudes from a light incident plane of a first resin layer towards a second resin layer with respect to internal light emitted from a light source such as a backlight unit and the like.

Herein, "in-plane retardation (Re)" is a value represented by Equation A:

$$Re=(nx-ny)\times d \quad \text{<Equation A>}$$

(in Equation A, where nx and ny are refractive index at a wavelength of 550 nm in the slow axis direction and the fast axis direction of a corresponding optical element, respectively, and d is the thickness of the corresponding optical element (unit: nm)).

As used herein, the term "(meth)acryl" refers to acryl and/or methacryl.

Hereinafter, an optical film for improving contrast ratio according to one embodiment of the present invention will be described with reference to FIGS. 1 to 3.

FIG. 1 is an exploded perspective view of an optical film for improving contrast ratio according to one embodiment of the present invention, FIG. 2 is a cross-sectional view of a first resin layer of FIG. 1, which is taken in a first direction, and FIG. 3 is a cross-sectional view of the first resin layer of FIG. 1, which is taken in a second direction.

Referring to FIG. 1, an optical film for improving contrast ratio 10 according to one embodiment may include a contrast ratio improvement layer 100 and a base layer 200.

The contrast ratio improvement layer 100 may include a first resin layer 110 and a second resin layer 120 formed on the first resin layer 110. The first resin layer 110, the second resin layer 120 and the base layer 200 may be sequentially stacked in the stated order, and the base layer 200 may be directly formed on the second resin layer 120. The first resin layer 110 includes a plurality of first optical patterns 111 embossed and separated from each other in a first direction, a plurality of second optical patterns 112 embossed to intersect the first optical patterns 111 at a predetermined angle and separated from each other in a second direction, and a intaglio portion 113 formed by intersection between the first optical pattern 111 and the second optical pattern 112. The first direction is different from the second direction. In FIG. 1, the first direction is a Y-Y axis direction and the second direction is an X-X axis direction.

The intaglio portion 113 has a height less than or equal to the height of the first resin layer 110. The second resin layer 120 is directly formed on the first resin layer 110. Herein, the expression "directly formed" means that any adhesive layer, any bonding layer, any adhesive/bonding layer, or any other layer is not interposed between the first resin layer and the second resin layer. Accordingly, the contrast ratio improvement layer refracts (when the height of the intaglio portion is the same as that of the first resin layer) and transmits light received from the first resin layer towards the second resin layer, in which the first resin layer includes the first optical patterns and the second optical patterns intersecting each other at a predetermined angle to diffuse transmitted light in all directions including the upward, downward, rightward and leftward directions on the display screen, thereby improving the contrast ratios (CRs) in all directions including the upward, downward, rightward and leftward directions.

On the first resin layer 110, the first optical patterns 111 are integrally formed with the second optical patterns 112. With this structure, the optical film suppresses bubble generation in manufacture or allows bubbles, if generated, to be easily removed, thereby improving quality of a display screen, and the optical film can be easily formed of a composition having high viscosity. Herein, the expression "integrally formed" means that the first optical pattern is not separated from the second optical pattern by physical force.

The contrast ratio improvement layer 100 may have a thickness of 10 μm to 100 μm, specifically 20 μm to 60 μm, more specifically 20 μm to 45 μm. Within this thickness range, the contrast ratio improvement layer 100 can be sufficiently supported on the base layer and can be used in an optical display.

The first resin layer 110 can diffuse light by refracting light in various directions through the first and second optical patterns depending upon an incidence location of light emitted from a light source of a backlight unit to a light incident plane in an optical display. The first resin layer 110 may be formed to directly adjoin the second resin layer 120.

The first resin layer 110 may include a plane facing the second resin layer 120. The plane of the first resin layer 110 facing the second resin layer 120 forms a light exit plane of the first resin layer 110. The light exit plane includes the plurality of first optical patterns 111 embossed on the light exit plane and separated from each other in the first direction, the plurality of second optical patterns 112 embossed on the light exit plane to intersect the first optical pattern 111 and separated from each other in the second direction, and the intaglio portion 113 formed by intersection between the first optical patterns 111 and the second optical patterns 112 and having a height less than or equal to the height of the first resin layer. Thus, the first optical patterns, the second optical patterns and the intaglio portion may constitute a flat surface on a lower surface of the first resin layer 110 through a support layer 114.

Now, the first optical patterns will be described in more detail with reference to FIG. 2.

The first optical pattern 111 diffuses light towards the second resin layer 120 to improve visibility in all directions including the upward, downward, rightward, leftward and diagonal directions in cooperation with the second optical pattern in an optical display. The first optical pattern 111 satisfies the following Equation 1 and may have a base angle θ1 of 75° to 90°. The base angle θ1 of 75° to 90° means that an angle defined between an inclined plane 111$a$ of the first optical pattern 111 and the maximum width W1 of the first optical pattern 111 ranges from 75° to 90°. Within this range, the first optical pattern 111 can improve relative front brightness together with front and side contrast ratios, while improving contrast ratios in all directions including the upward, downward, rightward and leftward directions. Specifically, the base angle θ1 may be 80° to 90° and a P1/W1 may be 1.2 to 4.

$$1 < P1/W1 \leq 10 \quad \text{<Equation 1>}$$

(in Equation 1, where P1 is the cycle of the first optical pattern (unit: μm) and W1 is the maximum width of the first optical pattern (unit: μm)).

Although FIG. 2 shows the structure wherein the first optical pattern has the same base angle at both sides thereof, the first optical pattern according to the present invention may have different base angles so long as the base angles range from 75° to 90°.

The first optical pattern 111 may be an embossed optical pattern, which is composed of one or more inclined planes 111$a$ and a first surface 111$b$ formed at the top part thereof and connected to the inclined planes 111$a$.

The first surface 111$b$ is formed at the top part of the first optical pattern and can diffuse light having reached the first resin layer 110 in the optical display, thereby increasing viewing angle and brightness. Accordingly, the optical film according to this embodiment can minimize brightness loss through improvement of light diffusion. Although FIG. 2 shows the structure wherein the first surface 111$b$ is a flat surface and is parallel to a bottom surface 113$a$ of the intaglio portion 113, the first surface 111$b$ may include fine ribbed surface or a curved surface. The first surface 111$b$ may have a width A1 of 0.5 μm to 30 μm, specifically 2 μm to 20 μm, or 5 μm to 10 μm.

Referring to FIG. 2, the first optical pattern 111 has a flat surface and the inclined planes are flat surfaces formed at the top part, and a trapezoidal cross-sectional shape of cross-section (for example, a prism pattern having a cross-section which truncated upper side of triangular, that is, a cut-prism shape). Alternatively, the first optical pattern may have a embossed pattern, in which the first surface is formed at the top part thereof and the inclined planes are curved surfaces (for example, a cut-lenticular lens which is a shape of a lenticular lens pattern truncated upper side or a cut-micro lens which is a shape of a micro lens pattern truncated upper side).

FIG. 2 shows the structure wherein the inclined planes 111$a$ are flat surfaces and an interface between the first optical pattern 111 and the intaglio portion 113 is a non-curved surface. Alternatively, the interface between the first optical pattern and the intaglio portion may be a curved surface. The curved interface between the first optical pattern and the intaglio portion can secure light spreading.

The first optical pattern 111 may have a height H1 of 40 μm or less, specifically 30 μm or less, more specifically 5 μm to 15 μm, still more specifically 5 μm to 10 μm. Within this range, the optical pattern can provide improvement in contrast ratio, viewing angle, and brightness while preventing the Moiré phenomenon. The first optical pattern 111 may have a maximum width W1 of 80 μm or less, specifically 50 μm or less, more specifically 5 μm to 20 μm, or 5 μm to 10 μm. Within this range, the optical pattern can provide improvement in contrast ratio, viewing angle, and brightness while preventing the Moiré phenomenon. The first optical pattern 111 may have a cycle P1 of 5 μm to 500 μm, specifically 10 μm to 50 μm, still more specifically 10 μm to 30 μm. Within this range, the first optical pattern can provide improvement in contrast ratio, viewing angle, and brightness while preventing the Moiré phenomenon.

The first optical pattern 111 may have an aspect ratio of 0.3 to 3.0, specifically 0.4 to 2.5, more specifically 0.4 to 1.5. Within this range, the first optical pattern can improve contrast ratio and viewing angle at upper, lower, right and left sides of an optical display.

In a structure wherein the intaglio portion 113 has the same height as the first optical pattern 111, the support layer 114 can be omitted.

Although FIG. 2 shows the structure wherein the first optical patterns 111 are separated from each other by the same distance, the separation distances between the first optical patterns 111 may be different.

Although FIG. 2 shows the structure wherein the first resin layer 110 includes three or more first optical patterns 111, it should be understood that the number of first optical patterns 111 is not particularly limited.

The second optical pattern will be described in more detail with reference to FIG. 3.

The second optical pattern 112 diffuses light towards the second resin layer 120 to improve visibility in all directions including the upward, downward, rightward and leftward directions in cooperation with the first optical patterns in the optical display. The second optical pattern satisfies the following Equation 2 and may have a base angle θ2 of 75° to 90°. The base angle θ2 of 75° to 90° means that an angle defined between an inclined plane 112$a$ of the second optical pattern 112 and the maximum width W1 of the second optical pattern 112 ranges from 75° to 90°. Within this range, the second optical pattern 112 can improve relative front brightness, front contrast ratio and side contrast ratio, while improving the contrast ratios in all directions including the upward, downward, rightward and leftward directions. Specifically, a base angle θ2 may be 80° to 90° and a P2/W2 may be 1.2 to 4.

$$1 < P2/W2 \leq 10 \quad \text{<Equation 2>}$$

(in Equation 2, where P2 is the cycle of the second optical pattern (unit: μm) and W2 is the maximum width of the second optical pattern (unit: μm)).

Although FIG. 3 shows the structure wherein the second optical pattern has the same base angle at both sides thereof, the second optical pattern according to the present invention may have different base angles so long as the base angles range from 75° to 90°.

The second optical pattern 112 may be an embossed optical pattern, which is composed of one or more inclined planes 112a and a second surface 112b formed at the top part thereof, and a second surface 112b connected to the inclined planes 112a.

The second surface 112b is formed at the top part of the second optical pattern and can diffuse light having reached the first resin layer 110 in the optical display, thereby increasing viewing angle and brightness. Accordingly, the optical film according to this embodiment can minimize brightness loss through improvement of light diffusion. Although FIG. 3 shows the structure wherein the second surface 112b is a flat surface and is parallel to the bottom surface 113a of the intaglio portion 113, the second surface 112b may include fine ribbed surface or a curved surface. The second surface 112b may have a width A2 of 0.5 μm to 30 μm, specifically 2 μm to 20 μm, or 5 μm to 10 μm.

Referring to FIG. 3, the second optical pattern 112 has a flat surface and the inclined planes are flat surfaces formed at the top part, and a trapezoidal cross-sectional shape of cross-section (for example, a prism pattern having a cross-section which truncated upper side of triangular, that is, a cut-prism shape). Alternatively, the second optical pattern may have a intaglio pattern, in which the second surface is formed at the top part thereof and the inclined planes are curved surfaces (for example, a cut-lenticular lens which is a shape of a lenticular lens pattern truncated upper side or a cut-micro lens which is a shape of a micro lens pattern truncated upper side).

The second optical pattern 112 may have the height H2, the maximum width W2, and the cycle P2 which is same or different as those of the first optical pattern 111. For example, the second optical pattern 112 may have a height H2 of 40 μm or less, specifically 30 μm or less, more specifically 5 μm to 15 μm, 5 μm to 10 μm. The second optical pattern 112 may have a maximum width W2 of 80 μm or less, specifically 50 μm or less, more specifically 5 μm to 20 μm, or 5 μm to 10 μm. The second optical pattern 112 may have a cycle P2 of 5 μm to 500 μm, specifically 10 μm to 50 μm, 10 μm to 30 μm. Within this range, the second optical pattern can provide improvement in contrast ratio, viewing angle, and brightness while preventing the Moiré phenomenon.

The second optical pattern 112 may have an aspect ratio of 0.3 to 3.0, specifically 0.4 to 2.5, more specifically 0.4 to 1.5. Within this range, the second optical pattern can improve contrast ratio and viewing angle at upper, lower, right and left sides of the optical display.

Although FIG. 3 shows the structure wherein the second optical patterns 112 are separated from each other by the same distance, the separation distances between the second optical patterns 112 may be different.

Although FIG. 3 shows the structure wherein the first resin layer 110 includes three or more second optical pattern 112, it should be understood that the number of second optical pattern 112 is not particularly limited.

Although FIG. 2 and FIG. 3 show the structure wherein the inclined planes of each of the first and second optical patterns are flat surfaces, the inclined planes thereof may be curved surfaces in order to prevent rapid change in brightness. In this structure, as shown in FIG. 4, the first and second optical patterns are cut-lenticular lens patterns having curved convex inclined planes, without being limited thereto. The base angle θ of the optical pattern is an angle in the range of 75° to 90°, as defined between a tangential line I at a point corresponding to half the height H(½H) of the optical pattern and the maximum width of the optical pattern.

In one embodiment, the first resin layer 110 includes the first optical patterns 111 and the second optical patterns 112 formed to intersect each other. Preferably, the first optical patterns 111 and the second optical patterns 112 may have the same structures in terms of maximum height, maximum width, base angle, and width of the surface at the top part and may be formed of the same material. Accordingly, the optical film according to the present invention has the same optical patterns in all directions and thus does not require cutting in a particular direction so as to comply with display characteristics, thereby allowing easy management of production yield and inventory.

Referring to FIG. 1 again, the first optical pattern 111 and the second optical pattern 112 may intersect each other at a predetermined angle to form the intaglio portion 113 therebetween.

The intaglio portion 113 is depressed towards a light incident plane with reference to a light exit plane of the first resin layer. Height of the intaglio portion 113 is less than or equal to that of the first resin layer 110. Accordingly, when light enters the first resin layer 110, the intaglio portion 113 refracts and transmits the light towards the second resin layer 120, thereby improving a front contrast ratio. An intersection angle between the first optical pattern 111 and the second optical pattern 112 may range from 80° to 100°, specifically 85° to 95°. More preferably, the intersection angle may be 90° such that the first optical patterns and the second optical patterns form a lattice pattern. Accordingly, the first resin layer 110 may have a net shape or a waffle shape.

Height H3 of the intaglio portion 113 may be greater than 0% to 100% or less the total height H4 of the first resin layer 110, specifically 10% to 90%, or 10% to 50%. Within this range, the optical film can have a high side contrast ratio without reduction in the front contrast ratio. The intaglio portion 113 may have a height H3 of 5 μm to 15 μm or 5 μm to 10 μm. Preferably, the first resin layer 110 may have a total height H4 of 5 μm to 50 μm and the intaglio portion may have a height H3 of 5 μm to 10 μm.

The intaglio portion 113 is formed at a portion at which the first optical pattern does not intersect the second optical pattern. The intaglio portion 113 is composed of a bottom surface 113a and four inclined planes 113b connected to the bottom surface 113a. The intaglio portion 113 may have a hexahedral shape, the bottom surface of which has a rectangular shape, and a ratio of the minimum width of the bottom surface to the maximum width thereof ranges from 0.5 to 1, specifically from 0.6 to 1. Within this range, the optical film can increase relative front brightness, reduce a difference between the front contrast ratio and the side contrast ratio, and increase the contrast ratio at the same side viewing angle and the same front viewing angle. In addition, the optical film can prevent the Moiré phenomenon.

In one embodiment, the bottom surface of the intaglio portion 113 is substantially parallel to the light incident plane of the first resin layer 110, the first surface 111b of the first optical pattern 111, and the second surface 112b of the second optical pattern 112.

The first resin layer 110 may have an area ratio of 45% to 85%, preferably 45% to 70%, as represented by the following Equation 3. Within this range, the contrast ratio improvement layer 100 can reduce the difference between the front contrast ratio and the side contrast ratio by preventing reduction in front contrast ratio while increasing the contrast ratios in all directions including the upward, downward, rightward and leftward directions, thereby improving quality of a display screen.

$$\text{Area ratio} = \{1 - ((P1 - A1) \times (P2 - A2))/(P1 \times P2)\} \times 100 \quad \text{<Equation 3>}$$

(in Equation 3, where P1 is the cycle of the first optical pattern (unit: μm),
P2 is the cycle of the second optical pattern (unit: μm),
A1 is the maximum width of the top part of the first optical pattern (unit: μm), and
A2 is the maximum width of the top part of the second optical pattern (unit: μm)).

The first resin layer 110 has a lower refractive index than the second resin layer 120. Specifically, an absolute value of a difference in refractive index between the second resin layer 120 and the first resin layer 110 is 0.20 or less, specifically 0.05 to 0.20, more specifically 0.10 to 0.15. Within this range, the optical film can secure significant improvement in diffusion of collected light and contrast ratio. Particularly, an optical film having a refractive index difference of 0.10 to 0.15 can provide good effects in diffusion of polarized light in an optical display, thereby improving brightness at the same viewing angle.

The first resin layer 110 may have a refractive index of less than 1.52, specifically 1.35 or more to less than 1.50. Within this range, the optical film can promote diffusion of light, can be easily fabricated, and can provide significant improvement in diffusion of polarized light and contrast ratio.

The first resin layer 110 may be formed of a UV curable composition or thermosetting composition including a transparent resin. Specifically, the resin may include at least of one (meth)acrylic, polycarbonate, silicone, and epoxy resins, without being limited thereto. The transparent resin may have a light transmittance of 90% or more after curing.

The optical film may further include an adhesive/bonding layer on a lower surface of the first resin layer. The adhesive/bonding layer may be formed on the lower surface of the contrast ratio improvement layer to attach the optical film for improving contrast ratio to an optical device such as a polarizing plate. In this way, with the adhesive/bonding layer, the optical film allows internal light to enter the first resin layer and then the optical patterns of the second resin layer in the optical display. The adhesive/bonding layer may include an adhesive layer, a bonding layer, or a combination thereof. The adhesive/bonding layer may be formed of a typical bonding agent known to those skilled in the art. For example, the bonding layer may include a thermosetting bonding agent or a photo-curable bonding agent. Specifically, the bonding layer may include a (meth)acrylic compound, an epoxy compound, a cyanoacrylate compound, an isocyanate compound, and the like. The adhesive layer may be formed of a pressure-sensitive adhesive including a (meth)acrylic adhesive resin, an epoxy resin, a urethane resin, and the like.

The first resin layer 110 may be formed of a non-adhesive resin or may be formed of an inherently adhesive/bonding resin exhibiting inherent adhesion so as to facilitate interlayer coupling or so as to eliminate an adhesive/bonding layer 250 upon interlayer coupling, thereby reducing the thickness of the optical film for improving contrast ratio. Details of the inherently adhesive/bonding resin are the same as those of the adhesive/bonding layer.

Referring to FIG. 1, the second resin layer 120 may directly adjoin the first resin layer 110. The second resin layer 120 may include a plane facing the first resin layer 110 and at least one filling pattern 121 may be formed on the plane of the second resin layer 120 facing the first resin layer 110. The filling patterns 121 may at least partially fill the intaglio portion 113. Herein, the expression "at least partially fill" includes both a structure wherein the intaglio portion is completely filled with the filling pattern and a structure wherein the intaglio portion is partially filled therewith. In the structure wherein the intaglio portion is partially filled with the filling pattern, a remaining portion of the intaglio portion may be filled with air or a resin having a predetermined refractive index. Specifically, the resin may have a refractive index which is the same as or higher than that of the second resin layer and is the same as or lower than that of the second resin layer. As shown in FIG. 1, the filling pattern may be formed in a dot shape. Herein, the term "dot" means that the filling patterns having a three-dimensional shape are arranged at regular intervals. Thus, according to the present invention, the second resin layer of the contrast ratio improvement layer may be a dot-shaped film.

The second resin layer 120 may have a refractive index of 1.50 or more, specifically 1.50 to 1.70. The second resin layer 120 may be formed of a UV-curable composition or a thermosetting composition including at least one of a (meth)acrylic resin, a polycarbonate resin, a silicone resin, and an epoxy resin, without being limited thereto.

Although not shown in FIG. 1, at least one of the first resin layer and the second resin layer may further include a light diffusion agent. The light diffusion agent can further improve light diffusion of the optical film. The light diffusion agent may include at least one of typical inorganic, organic, and organic-inorganic hybrid light diffusion agents.

Referring to FIG. 1 again, the base layer 200 is formed on the contrast ratio improvement layer 100 to protect the contrast ratio improvement layer 100 while supporting the contrast ratio improvement layer 100. The base layer 200 is a light transmittance layer and a light incident plane (that is, lower surface) of the base layer 200 directly adjoins the contrast ratio improvement layer 100. With this structure, the base layer 200 allows light having passed through the contrast ratio improvement layer 100 to pass therethrough in an optical display.

The base layer 200 may be integrated with the contrast ratio improvement layer 100. Herein, the term "integrated" means a structure wherein the base layer and the contrast ratio improvement layer are not independently separated from each other.

The base layer 200 may be a retardation film providing a certain range of phase retardation or an isotropic optical film. In one embodiment, the base layer 200 may have an in-plane retardation Re of 8,000 nm or more, specifically 10,000 nm or more, more specifically higher than 10,000 nm, still more specifically 10,100 nm to 15,000 nm. Within this range, the base layer can prevent generation of rainbow spots and can promote diffusion of light having passed through the contrast ratio improvement layer. In other embodiments, the base layer may have an in-plane retardation Re of 60 nm or less, specifically 0 nm to 60 nm, more specifically 40 nm to 60 nm, thereby acting as an isotropic optical film. Within this range of in-plane retardation, the base layer can provide good image quality through compensation for viewing angle. Herein, the term "isotropic optical film" means a film having substantially the same nx, ny and nz. Herein, the expression "substantially the same" includes not only the case where nx, ny and nz are completely the same, but also the case where there is an acceptable margin of error.

The base layer 200 may have a thickness of 30 μm to 120 μm, specifically 55 μm to 105 μm. Within this thickness range, the optical film including the base layer can be used in an optical display. The base layer 200 may have a light transmittance of 80% or more, specifically 85% to 95%, in the wavelength band of visible light. The base layer 200 may include a film obtained by uniaxially or biaxially stretching an optically transparent resin film. Specifically, the resin may include at least one of polyesters including polyethylene terephthalate (PET), polybutylene terephthalate, polyethylene naphthalate, and polybutylene naphthalate, cellulose esters including acryl resins, cyclic olefin polymer (COP) resins and triacetylcellulose (TAC), polyvinyl acetate, polyvinyl chloride (PVC), polynorbornene, polycarbonate (PC), polyamide, polyacetal, polyphenylene ether, polyphenylene sulfide, polysulfone, polyether sulfone, polyacrylate, and polyimide. The base layer 200 may include a film produced through modification of at least one of those resins. Modification may include copolymerization, branching, crosslinking, or modification of molecular terminals.

Although not shown in FIG. 1, the base layer may include a base film and a primer layer formed on at least one surface of the base film. The base film supports the base layer and may have a refractive index ratio in a predetermined range with respect to the primer layer, thereby improving transmittance of the base layer. Specifically, a refractive index ratio of the primer layer to the base film (refractive index of the primer layer/refractive index of the base film) may be 1.0 or less, specifically 0.6 to 1.0, more specifically 0.69 to 0.95, still more specifically 0.7 to 0.9, still more specifically 0.72 to 0.88. Within this range, the base film can improve transmittance of the base layer. The base film may have a refractive index of 1.3 to 1.7, specifically 1.4 to 1.6. Within this range, the base film can be applied to the base layer, can facilitate regulation of the refractive index with respect to the primer layer, and can improve transmittance of the base layer. The base film may include a film formed of the resins described above. The primer layer is formed between the base film and the second resin layer, and can reinforce adhesion between the base film and the second resin layer. The primer layer may have a refractive index of 1.0 to 1.6, specifically 1.1 to 1.6, more specifically 1.1 to 1.5. Within this range of refractive index, the primer layer can be used in the optical film and exhibit a suitable refractive index with respect to the refractive index of the base film, thereby improving transmittance of the base layer. The primer layer may have a thickness of 1 nm to 200 nm, specifically 60 nm to 200 nm. Within this thickness range, the primer layer can be used in the optical film and can exhibit a suitable refractive index with respect to the refractive index of the base film, thereby improving transmittance of the base layer without suffering from brittleness. The primer layer may be a non-urethane primer layer free from a urethane group. Specifically, the primer layer may be formed of a primer layer composition including resins, such as a polyester resin, an acryl resin, or monomers thereof. The primer layer can secure the refractive index in the above range by adjusting a mixing ratio of these monomers (for example: molar ratio). The primer layer composition may further include at least one additive such as a UV absorbent, an antistatic agent, an antifoaming agent, a surfactant, and the like.

Although not shown in FIG. 1, the optical film may further include a functional layer on the other surface of the base layer 200. The functional layer may be formed as a discrete layer or may be integrally formed with the base layer. The functional layer can provide at least one of anti-reflection, low reflection, hard coating, anti-glare, anti-fingerprint, anti-contamination, diffusion and refraction functions.

The optical film for improving contrast ratio 10 may have a light transmittance of 80% or more, specifically 85% to 95%, in the wavelength band of visible light (for example: in the wavelength range of 380 nm to 780 nm). Within this range, the optical film can be used in an optical display.

The optical film for improving contrast ratio 10 may have a thickness of 50 μm to 200 μm. Within this range, the optical film can secure the light diffusing effect.

FIG. 1 shows the structure wherein the first resin layer, the second resin layer and the base layer are sequentially stacked one above another and the base layer is directly formed on the second resin layer. Alternatively, the first resin layer may have a higher refractive index than the second resin layer. That is, according to the present invention, the first resin layer may have a different refractive index than the second resin layer. Specifically, the first resin layer may have a refractive index of 1.50 or more, specifically 1.50 to 1.70, and the second resin layer have a refractive index of less than 1.52, specifically 1.35 to less than 1.50. Within these ranges of indexes of refraction, the optical film can promote diffusion of light, can be easily fabricated, and can provide significant improvement in diffusion of polarized light and contrast ratio. In this case, an absolute value of a difference in refractive index between the first resin layer and the second resin layer is 0.20 or less, specifically 0.05 to 0.20, more specifically 0.10 to 0.15. Within this range, the optical film can secure significant improvement in diffusion of collected light and contrast ratio.

Next, an optical film for improving contrast ratio according to another embodiment of the present invention will be described.

FIG. 5 is an exploded perspective view of an optical film for improving contrast ratio according to another embodiment of the present invention.

Referring to FIG. 5, an optical film for improving contrast ratio 20 according to this embodiment is substantially the same as the optical film for improving contrast ratio 10 according to the above embodiment except that the optical film for improving contrast ratio 20 further includes an adhesive/bonding layer 250 formed on a lower surface of a first resin layer 110.

A polarizing plate according to the present invention may include the optical film for improving contrast ratio according to the embodiments of the present invention.

Next, a polarizing plate according to one embodiment of the present invention will be described. FIG. 6 is a sectional view of a polarizing plate according to one embodiment of the present invention.

Referring to FIG. 6, a polarizing plate 30 according to one embodiment includes a first protective layer 300, a polarizer 400, a second protective layer 500, an adhesive/bonding layer 250, and an optical film for improving contrast ratio, wherein the optical film for improving contrast ratio may include a contrast ratio improvement layer 100 and a base layer 200 according to the present invention. In the structure wherein the polarizing plate includes the optical film for improving contrast ratio, polarized light having passed through the polarizer is diffused while sequentially passing through the first resin layer and second resin layer, thereby improving the front contrast ratio and the side contrast ratio, reducing a difference between the front contrast ratio and the side contrast ratio, and improving contrast ratio at the same side viewing angle and the same front viewing angle. The polarizing plate 30 may have a thickness of 150 μm to 400 μm. Within this thickness range, the polarizing plate can be used in an optical display.

The first protective layer 300 can protect the polarizer 400 while increasing mechanical strength of the polarizing plate 50. The first protective layer 300 may have a total light transmittance of 90% or more, specifically 90% to 100%, in the wavelength band of visible light.

The first protective layer may be an isotropic film. The isotropic film may have an in-plane retardation Re of 60 nm or less, for example, 0 nm to 60 nm. Alternatively, the first protective layer may be a retardation film. The retardation film may have in-plane retardation Re of 100 nm to 220 nm, more specifically 100 nm to 180 nm, and may be, for example, a λ/4 retardation film (that is, a quarter-wave plate, QWP). The retardation film may have an in-plane retardation Re of 225 nm to 350 nm, specifically 225 nm to 300 nm, and may be, for example, a λ/2 retardation film (that is, a half wave plate, HWP).

The first protective layer 300 may include at least one of an optically transparent protective film and an optically transparent protective coating layer.

In the structure wherein the first protective layer is realized by the protective film type, the protective film may be formed of an optically transparent resin. The protective film may be produced through melt extrusion of the resin. The protective film may be subjected to stretching, as needed. The resin may include at least one of cellulose ester resins such as triacetylcellulose (TAC), cyclic polyolefin resins such as an amorphous cyclic olefin polymer (COP), polycarbonate resins, polyester resins such as polyethylene terephthalate (PET), polyethersulfone resins, polysulfone resins, polyamide resins, polyimide resins, non-cyclic polyolefin resins, polyacrylate resins such as poly(methyl methacrylate), polyvinyl alcohol resins, polyvinyl chloride resins, and polyvinylidene resins. The protective film may be an optically transparent liquid crystal film.

In the structure wherein the first protective layer is realized by the protective coating layer type, the protective coating layer can secure good properties in terms of adhesion to the polarizer, transparency, mechanical strength, thermal stability, moisture blocking performance, and durability. In one embodiment, the protective coating layer may be formed of an active energy ray-curable resin composition, which includes an active energy ray-curable compound and a polymerization initiator. The active energy ray-curable compound may include at least one of cationic polymerizable curable compounds, radical polymerizable curable compounds, urethane resins, and silicone resins. The cationic polymerizable curable compounds may include at least one of an epoxy compound containing at least one epoxy group therein and an oxetane compound containing at least one oxetane ring therein. The radical polymerizable curable compound may be a (meth)acrylic compound having at least one (meth)acryloyloxy group therein. The epoxy compound may include at least one of hydrogenated epoxy compounds, chain-type aliphatic epoxy compounds, alicyclic epoxy compounds, and aromatic epoxy compounds. The radical polymerizable curable compound can realize a protective coating layer that exhibits excellent properties in terms of hardness, mechanical strength and durability. The radical polymerizable curable compound may be obtained by reacting a (meth)acrylate monomer having at least one (meth) acryloyloxy group, and may include a (meth)acrylate oligomer having at least two (meth)acryloyloxy groups therein obtained by reaction of two or more types of functional group-containing compounds. Examples of the (meth)acrylate monomer include a monofunctional (meth)acrylate monomer having a single (meth)acryloyloxy group, a bifunctional (meth)acrylate monomer having two (meth) acryloyloxy groups, and a polyfunctional (meth)acrylate monomer having three or more (meth)acryloyloxy groups. The (meth)acrylate oligomer may include a urethane (meth) acrylate oligomer, a polyester (meth)acrylate oligomer, an epoxy (meth)acrylate oligomer, and the like. The polymerization initiator can cure the active energy ray-curable composition. The polymerization initiator may include at least one of a photo-cationic polymerization initiator and a photosensitizer.

As the photo-cationic polymerization initiator, any typical photo-cationic polymerization initiator known in the art may be used. Specifically, the photo-cationic polymerization initiator may include an onium salt containing a cation and an anion. Examples of the cation may include: diaryliodonium such as diphenyliodonium, 4-methoxydiphenyliodonium, bis(4-methylphenyl)iodonium, bis(4-tert-butylphenyl)iodonium, bis(dodecylphenyl)iodonium, and (4-methylphenyl) [(4-(2-methylpropyl)phenyl)iodonium; triarylsulfonium such as triphenylsulfonium and diphenyl-4-thiophenoxyphenylsulfonium; bis[4-(diphenylsulfonio)-phenyl]sulfide; and the like. Examples of the anion may include hexafluorophosphate, tetrafluoroborate, hexafluoroantimonate, hexafluoroarsenate, hexachloroantimonate, and the like. As the photosensitizer, any typical photosensitizer known in the art may be used. Specifically, the photosensitizer may include at least one of thioxanthone, phosphorus, triazine, acetophenone, benzophenone, benzoin, and oxime photosensitizers. The polymerization initiator may be present in an amount of 0.01 parts by weight to 10 parts by weight relative to 100 parts by weight of the active energy ray-curable compound. Within this range, the polymerization initiator can secure sufficient curing of the composition to provide high mechanical strength and good adhesion to the polarizer. The active energy ray-curable resin composition may further include typical additives such as a silicone leveling agent, a UV absorbent, an antistatic agent, and the like. The additives may be present in an amount of 0.01 parts by weight to 1 part by weight relative to 100 parts by weight of the active energy ray-curable compound. The protective coating layer may be a liquid crystal coating layer.

The first protective layer 300 may have a thickness of 5 μm to 200 μm, specifically 30 μm to 120 μm. The first protective layer may have a thickness of 50 μm to 100 μm when realized by the protective film and a thickness of 5 μm to 50 μm when realized by the protective coating layer. Within this thickness range, the first protective layer can be used in a light emitting display.

Although not shown in FIG. 6, the aforementioned functional layer may be further formed on an upper surface of the base layer of the optical film for improving contrast ratio. The functional layer can provide at least one of anti-reflection, low reflection, hard coating, anti-glare, anti-fingerprint, anti-contamination, diffusion and refraction functions. In addition, although not shown in FIG. 6, in the structure wherein the first protective layer is realized by the protective film, a bonding layer may be further formed between the first protective layer and the polarizer. The bonding layer may be formed of a typical bonding agent for polarizing plates, for example, a water-based bonding agent, a photocurable bonding agent, and a pressure sensitive bonding agent.

The polarizer 400 is formed on the first protective layer 300 to polarize incident light and may include a typical polarizer known to those skilled in the art. Specifically, the polarizer may include a polyvinyl alcohol-based polarizer produced by uniaxially stretching a polyvinyl alcohol-based film, or a polyene-based polarizer produced by dehydration of the polyvinyl alcohol-based film. The polarizer 400 may have a thickness of 5 μm to 40 μm. Within this range, the polarizer can be used in an optical display.

The second protective layer 500 is formed on the polarizer 400 and can protect the polarizer while improving mechanical strength of the polarizing plate. The second protective layer may include at least one of a protective film and a protective coating layer as described with reference to the first protective layer, and may have the same or different features from the first protective layer 300 in terms of thickness, material and retardation.

Although FIG. 6 shows the polarizing plate including the second protective layer 500, a polarizing plate according to another embodiment can eliminate the second protective layer in the structure wherein the first resin layer 110 is formed of the thermosetting composition or a UV-curable composition. As shown in FIG. 7, a polarizing plate 40 according to this embodiment may include: a first protective layer 300; a polarizer 400; an adhesive/bonding layer 250; and an optical film for improving contrast ratio including a contrast ratio improvement layer 100 and a base layer 200, which are sequentially stacked in this order.

In another embodiment, the first resin layer 110 may be formed of an inherently adhesive/bonding resin exhibiting inherent adhesion. In this embodiment, the adhesive/bonding layer 250 can be omitted thereby a polarizing plate 50 directly adjoins with the polarizer 400 and the contrast ratio improvement layer 100. Referring to FIG. 8, a polarizing plate 50 according to this embodiment may include: a first protective layer 300; a polarizer 400; and an optical film for improving contrast ratio including a contrast ratio improvement layer 100 and a base layer 200, which are sequentially stacked in this order such that the polarizer 400 directly adjoins the optical film for improving contrast ratio. In a further embodiment, as shown in FIG. 9, a polarizing plate 60 may include: a first protective layer 300; a polarizer 400; a second protective layer 500; an optical film for improving contrast ratio including a contrast ratio improvement layer 100 and a base layer 200, which are sequentially stacked in this order such that the second protective layer 500 directly adjoins the optical film for improving contrast ratio.

A liquid crystal display according to the present invention may include the optical film for improving contrast ratio according to the present invention or the polarizing plate according to the present invention. In one embodiment, the liquid crystal display may include a backlight unit, a first polarizing plate, a liquid crystal panel, and a second polarizing plate, which are sequentially stacked in the stated order, wherein the second polarizing plate may include the polarizing plate according to the present invention. The liquid crystal panel may employ a vertical alignment (VA) mode, an IPS mode, a patterned vertical alignment (PVA) mode, or a super-patterned vertical alignment (S-PVA) mode, without being limited thereto.

Hereinafter, the present invention will be described in more detail with reference to some examples. However, it should be understood that these examples are provided for illustration only and are not to be construed in any way as limiting the present invention.

EXAMPLE 1

A UV-curable resin (SSC-5760, Shin-A T&C) was coated onto an engraved pattern mold (film) having a intaglio portion to form a coating layer and a PET film (thickness: 80 µm, Re=14,000 nm at a wavelength of 550 nm, Toyobo Co., Ltd.) was bonded to one surface of the coating layer and cured to form a second resin layer (support layer, thickness: 8 µm) having a pattern of filling dots. A UV-curable resin (SSC-4560, Shin-A T&C) was coated to fill a space between the filling dots on the second resin layer and cured to form a first resin layer. A support layer of the first resin layer had a thickness of 15 µm. The first resin layer includes a first optical pattern and a second optical pattern, as listed in Table 1. Here, the first optical pattern and the second optical pattern were formed to intersect each other at 90° so as to form a lattice pattern and a intaglio portion was formed in a region in which the first optical pattern did not intersect the second optical pattern. As a result, an optical film for improving contrast ratio was obtained. The first resin layer had a refractive index of 1.47 and the second resin layer had a refractive index of 1.59.

A polarizer was prepared by stretching a polyvinyl alcohol film at 60° C. to three times an initial length thereof and adsorbing iodine to the stretched film, followed by stretching the resulting film to 2.5 times the stretched length of the film in an aqueous solution of boric acid at 40° C.

A bonding agent for polarizing plates (Z-200, Nippon Goshei Co., Ltd.) was respectively deposited onto one and another surfaces of the polarizer, and the surfaces are bonded with protective layers such a COP film (ZEON Company) as first protective layers and a PET film (thickness: 80 µm, Toyobo Co., Ltd.) as second protective layers.

An adhesive layer was formed on one surface of the first resin layer by depositing an acrylic resin adhesive thereon, and the PET film provided as the second protective layer was attached thereto via the adhesive layer, thereby providing a polarizing plate including the COP film (first protective layer), the bonding layer, the polarizer, the bonding layer, the PET film (second protective layer), the adhesive layer, and the optical film for improving contrast ratio sequentially stacked in this order.

EXAMPLE 2

An optical film for improving contrast ratio was prepared in the same manner as in Example 1 excluding the first optical pattern and the second optical pattern changed as listed in Table 1. A polarizing plate was manufactured in the same manner as in Example 1.

Comparative Example 1

A polarizing plate not including an optical film for improving contrast ratio was manufactured in the same manner as in Example 1.

Comparative Example 2

A UV-curable resin (SSC-5760, Shin-A T&C) was coated onto one surface of a PET film (thickness: 80 µm, Re=14,000 nm at a wavelength of 550 nm, Toyobo Co., Ltd.). Then, using a film having a patterned portion, engraved patterns and a flat section were formed on the coating layer and cured to forming a second resin layer. The patterned portion of the film included embossed stripe patterns having a trapezoidal cross-sectional shape and the flat section formed between the embossed patterns and having a width of 7 µm, in which the stripe patterns had the same base angle of 86° at both sides thereof, a maximum width of 7 µm, a height of 7 µm, and a minimum width of 6 µm.

Then, a UV-curable resin (SSC-4560, Shin-A T&C) was coated onto the second resin layer to form a first resin layer having a filling pattern completely filling the engraved patterns, thereby forming an optical film for improving contrast ratio. The optical film included a contrast ratio improvement layer having the stripe patterns formed in a stripe shape, as shown in FIG. 10. The first resin layer had a refractive index of 1.47 and the second resin layer had a refractive index of 1.59.

A polarizer was prepared in the same manner as in Example 1.

A bonding agent for polarizing plates (Z-200, Nippon Goshei Co., Ltd.) was respectively deposited onto one and another surfaces of the polarizer, and the surfaces are bonded with protective layers such a COP film (ZEON Company) as first protective layers and a PET film (thickness: 80 μm, Toyobo Co., Ltd.) as second protective layers.

An adhesive layer was formed on one surface of the first resin layer by depositing an acrylic resin adhesive thereon and the PET film provided as the second protective layer was attached thereto via the adhesive layer, thereby providing a polarizing plate including the COP film, the bonding layer, the polarizer, the bonding layer, the PET film, the adhesive layer, the first resin layer, the second resin layer, and the PET film sequentially stacked in this order.

TABLE 1

|  | Shape | Example 1 cut-prism | Example 2 cut-prism |
|---|---|---|---|
| First optical pattern | Maximum width (W1) (μm) | 7 | 7 |
|  | Height (H1) (μm) | 7 | 7 |
|  | Cycle (P1) (μm) | 14 | 22 |
|  | Base angle (θ1) (°) | 86 | 86 |
|  | Width of first surface (A1) (μm) | 6 | 6 |
| Second optical pattern | Maximum width (W2) (μm) | 7 | 7 |
|  | Height (H2) (μm) | 7 | 7 |
|  | Cycle (P2) (μm) | 14 | 22 |
|  | Base angle (θ2) (°) | 86 | 86 |
|  | Width of second surface (A2) (μm) | 6 | 6 |
| Area ratio of Equation 3 (%) |  | 67 | 47 |

Preparative Example 1: Manufacture of Optical Sheet

A composition comprising 35 wt % of epoxy acrylate, 15 wt % of a urethane acrylate oligomer, 36 wt % of orthophenylphenol ethoxylated acrylate, 10 wt % of trimethylolpropane 9-ethoxylated acrylate, and 4 wt % of a photoinitiator was prepared. The composition was coated onto one surface of a PET film (T910E, thickness: 125 μm, Mitsubishi Co., Ltd.) to form a coating layer. A prism pattern (triangular cross-section, height: 12 μm, cycle: 24 μm, vertex angle: 90°) was transferred from a pattern roll corresponding to the prism pattern to the coating layer, followed by curing, thereby forming a first optical sheet having a first prism pattern formed thereon. The composition was coated onto one surface of a PET film (T910E, thickness: 125 μm, Mitsubishi Co., Ltd.) to form a coating layer. A prism pattern (triangular cross-section, height: 12 μm, cycle: 24 μm, vertex angle: 90°, aspect ratio: 0.5) was transferred from a pattern roll corresponding to the prism pattern to the coating layer, followed by curing, thereby forming a second optical sheet having a second prism pattern formed thereon. An optical sheet was manufactured by stacking the second optical sheet on the first optical sheet such that the longitudinal direction of the first prism pattern was orthogonal to the longitudinal direction of the second prism pattern.

Preparative Example 2: Manufacture of First Polarizing Plate

A first polarizer was produced by stretching a polyvinyl alcohol film at 60° C. to three times an initial length thereof and adsorbing iodine to the stretched film, followed by stretching the resulting film to 2.5 times the stretched length of the film in an aqueous solution of boric acid at 40° C. A first polarizing plate was manufactured by bonding triacetylcellulose films (thickness: 80 μm) to both surfaces of the first polarizer via a bonding agent for polarizing plates (Z-200, Nippon Goshei Co., Ltd.).

Preparative Example 3: Manufacture of Liquid Crystal Display Module

The composite optical sheet of Preparative Example 1, the first polarizing plate of Preparative Example 2, a liquid crystal panel (PVA mode), and the polarizing plates produced in Examples and Comparative Examples were sequentially assembled, thereby fabricating a liquid crystal display module. Here, each of the polarizing plates produced in Examples and Comparative Examples was mounted such that the optical film for improving contrast ratio was disposed at the outermost side in a light exit direction.

Schematic configurations of the liquid crystal display modules are provided in Table 2. The liquid crystal display modules of Examples and Comparative Examples were evaluated as to the following properties, and evaluation results are shown in Table 2.

(1) Brightness and relative brightness: An LED light source, a light guide plate, and a liquid crystal display module (21.5″) in a VA mode were assembled to fabricate a liquid crystal display including an edge type LED light source at one side thereof. Front brightness was measured in a white mode and a black mode in a spherical coordinate system (0°, 0° using an EZ CONTRAST X88RC (EZXL-176R-F422A4, ELDIM Co., Ltd.). Relative brightness was calculated by {(brightness of Example or Comparative Example)/(brightness of Comparative Example 1)}×100. A target relative brightness was 90% or more.

(2) Contrast ratio: A liquid crystal display was manufactured in the same manner as in (1) and contrast ratio was measured in a spherical coordinate system (Φ, θ) of Table 2 using an EZ CONTRAST X88RC (EZXL-176R-F422A4, ELDIM Co., Ltd.).

(3) Viewing angle: A liquid crystal display was manufactured in the same manner as in (1) and viewing angle was measured in the same manner as in (1) using an EZ CONTRAST X88RC (EZXL-176R-F422A4, ELDIM Co., Ltd.). ½ viewing angle and ⅓ viewing angle indicate viewing angles at which brightness becomes ½ or ⅓ of front brightness.

TABLE 2

|  |  | Example 1 | Example 2 | Comparative Example 1 | Comparative Example 2 |
|---|---|---|---|---|---|
| @ white mode | Brightness (nit) | 157 | 154 | 165 | 157 |
|  | Relative brightness (%) | 95 | 93 | 100 | 95 |

TABLE 2-continued

|  |  | Example 1 | Example 2 | Comparative Example 1 | Comparative Example 2 |
|---|---|---|---|---|---|
| @ black mode | Brightness (nit) | 0.138 | 0.142 | 0.097 | 0.135 |
|  | Relative brightness (%) | 142 | 146 | 100 | 139 |
| Front contrast ratio (0°, 0°) | Contrast ratio | 1137 | 1083 | 1703 | 1166 |
|  | Relative contrast ratio (%) | 67 | 64 | 100 | 68 |
| Side (right side) contrast ratio (45°, 0°) | Contrast ratio | 94 | 91 | 85 | 114 |
|  | Relative contrast ratio (%) | 111 | 107 | 100 | 134 |
| Side (upper side) contrast ratio (45°, 90°) | Contrast ratio | 77 | 61 | 52 | 45 |
|  | Relative contrast ratio (%) | 148 | 117 | 100 | 87 |
| Side (right side) contrast ratio (60°, 0°) | Contrast ratio | 56 | 54 | 46 | 72 |
|  | Relative contrast ratio (%) | 122 | 117 | 100 | 157 |
| Side (upper side) contrast ratio (60°, 90°) | Contrast ratio | 41 | 32 | 28 | 26 |
|  | Relative contrast ratio (%) | 146 | 114 | 100 | 93 |
| Viewing angle | ½ Viewing angle | 80 | 82 | 80 | 84 |
|  | ⅓ Viewing angle | 98 | 98 | 96 | 102 |

As shown in Table 2, the optical films for improving contrast ratio according to the present invention can provide significant improvement in contrast ratio not only at the front side but also at all of upper, lower, right and left sides.

It should be understood that various modifications, changes, alterations, and equivalent embodiments can be made by those skilled in the art without departing from the spirit and scope of the invention.

The invention claimed is:

1. An optical film for improving contrast ratio, including: a base layer; and a contrast ratio improvement layer formed on the base layer,
wherein the contrast ratio improvement layer includes a first resin layer and a second resin layer directly formed on the first resin layer,
the first resin layer and the second resin layer having different refractive indexes,
the first resin layer including a plurality of first optical patterns embossed and spaced from each other in a first direction, a plurality of second optical patterns embossed to intersect the first optical patterns and spaced from each other in a second direction, and a plurality of intaglio portions spaced apart from one another by the first optical patterns and the second optical patterns and recessed from a top part of the first resin layer, an intaglio portion of the plurality of intaglio portions having four planes formed by intersection between the first optical patterns and the second optical patterns, the four planes extending between a bottom surface of the first resin layer and a top surface of the first resin layer,
the intaglio portion having a height less than or equal to a total height of the first resin layer.

2. The optical film for improving contrast ratio according to claim 1, wherein an absolute value of a difference in refractive index between the second resin layer and the first resin layer is in a range from 0.05 to 0.20.

3. The optical film for improving contrast ratio according to claim 1, wherein the first optical pattern satisfies Equation 1 and has a base angle of 75° to 90°:

$$1 < P1/W1 \leq 10, \quad \text{<Equation 1>}$$

where P1 is a cycle of the first optical pattern (unit: μm) and W1 is a maximum width of the first optical pattern (unit: μm).

4. The optical film for improving contrast ratio according to claim 3, wherein the second optical pattern satisfies Equation 2 and has a base angle of 75° to 90°:

$$1 < P2/W2 \leq 10 \quad \text{≤Equation 2>}$$

where P2 is a cycle of the second optical pattern (unit: μm) and W2 is a maximum width of the second optical pattern (unit: μm).

5. The optical film for improving contrast ratio according to claim 1, wherein the first optical pattern includes a first surface formed at a top part thereof and at least one inclined plane connected to the first surface, the inclined plane having an embossed optical pattern of a flat surface or a curved surface.

6. The optical film for improving contrast ratio according to claim 4, wherein the first surface is a flat surface and is parallel to a bottom surface of the intaglio portion.

7. The optical film for improving contrast ratio according to claim 5, wherein the second optical pattern includes a second surface formed at a top part thereof and at least one inclined plane connected to the second surface, the inclined plane having an embossed optical pattern of a flat surface or a curved surface.

8. The optical film for improving contrast ratio according to claim 7, wherein the second surface is a flat surface and is parallel to a bottom surface of the intaglio portion.

9. The optical film for improving contrast ratio according to claim 1, wherein each of the first optical patterns and the second optical patterns has an aspect ratio of 0.3 to 3.0.

10. The optical film for improving contrast ratio according to claim 1, wherein the first optical patterns and the second optical patterns intersect at an angle of 80° to 100°.

11. The optical film for improving contrast ratio according to claim 1, wherein the first optical patterns and the second optical patterns intersect at 90° and the first resin layer forms a lattice pattern.

12. The optical film for improving contrast ratio according to claim 1, wherein the first resin layer has an area ratio of 45% to 85%, as represented by Equation 3:

$$\text{Area ratio} = \{1 - ((P1 - A1) \times (P2 - A2))/(P1x\ P2)\} \times 100, \quad \text{<Equation 3>}$$

where P1 is a cycle of the first optical pattern (unit: μm),

P2 is a cycle of the second optical pattern (unit: μm),

A1 is a maximum width of a top part of the first optical pattern (unit: μm), and A2 is a maximum width of a top part of the second optical pattern (unit: μm).

13. The optical film for improving contrast ratio according to claim 1, wherein the second resin layer includes a filling pattern at least partially filling the intaglio portion, the filling pattern of the second resin layer being formed in a dot shape.

14. The optical film for improving contrast ratio according to claim 1, wherein a height of the intaglio portion is 10% to 90% of the total height of the first resin layer.

15. The optical film for improving contrast ratio according to claim 1, wherein the first resin layer, the second resin layer and the base layer are sequentially stacked, and the base layer is directly formed on the second resin layer.

16. The optical film for improving contrast ratio according to claim 1, wherein the first resin layer has a lower refractive index than the second resin layer.

17. The optical film for improving contrast ratio according to claim 1, wherein the base layer has an in-plane retardation Re of 8,000 nm or more at a wavelength of 550 nm, as represented by Equation A:

$$Re = (nx - ny) \times d, \quad \text{<Equation A>}$$

where nx and ny are refractive indexes at a wavelength of 550 nm in the slow axis direction and the fast axis direction of the base layer, respectively, and d is a thickness of the base layer (unit:nm).

18. A polarizing plate including the optical film for improving contrast ratio according to claim 1.

19. The polarizing plate according to claim 18, including: a first protective layer; a polarizer; a second protective layer, an adhesive/bonding layer, and the optical film for improving contrast ratio sequentially formed in the stated order.

20. The polarizing plate according to claim 18, including: a first protective layer; a polarizer; a second protective layer, and the optical film for improving contrast ratio sequentially formed in the stated order, the second protective layer directly adjoining the optical film for improving contrast ratio.

21. The polarizing plate according to claim 20, wherein the first resin layer of the optical film is formed of an adhesive/bonding resin.

22. The polarizing plate according to claim 18, including: a first protective layer; a polarizer; an adhesive/bonding layer; and the optical film for improving contrast ratio sequentially formed in the stated order.

23. The polarizing plate according to claim 18, including: a first protective layer; a polarizer; and the optical film for improving contrast ratio sequentially formed in the stated order, the polarizer directly adjoining the optical film for improving contrast ratio.

24. The polarizing plate according to claim 23, wherein the first resin layer of the optical film for improving contrast ratio is formed of an adhesive/bonding resin.

25. A liquid crystal display including the optical film for improving contrast ratio according to claim 1.

* * * * *